April 16, 1946.    C. J. REIMULLER    2,398,558
HYDRAULIC POWER UNIT
Filed Nov. 22, 1943    2 Sheets-Sheet 1
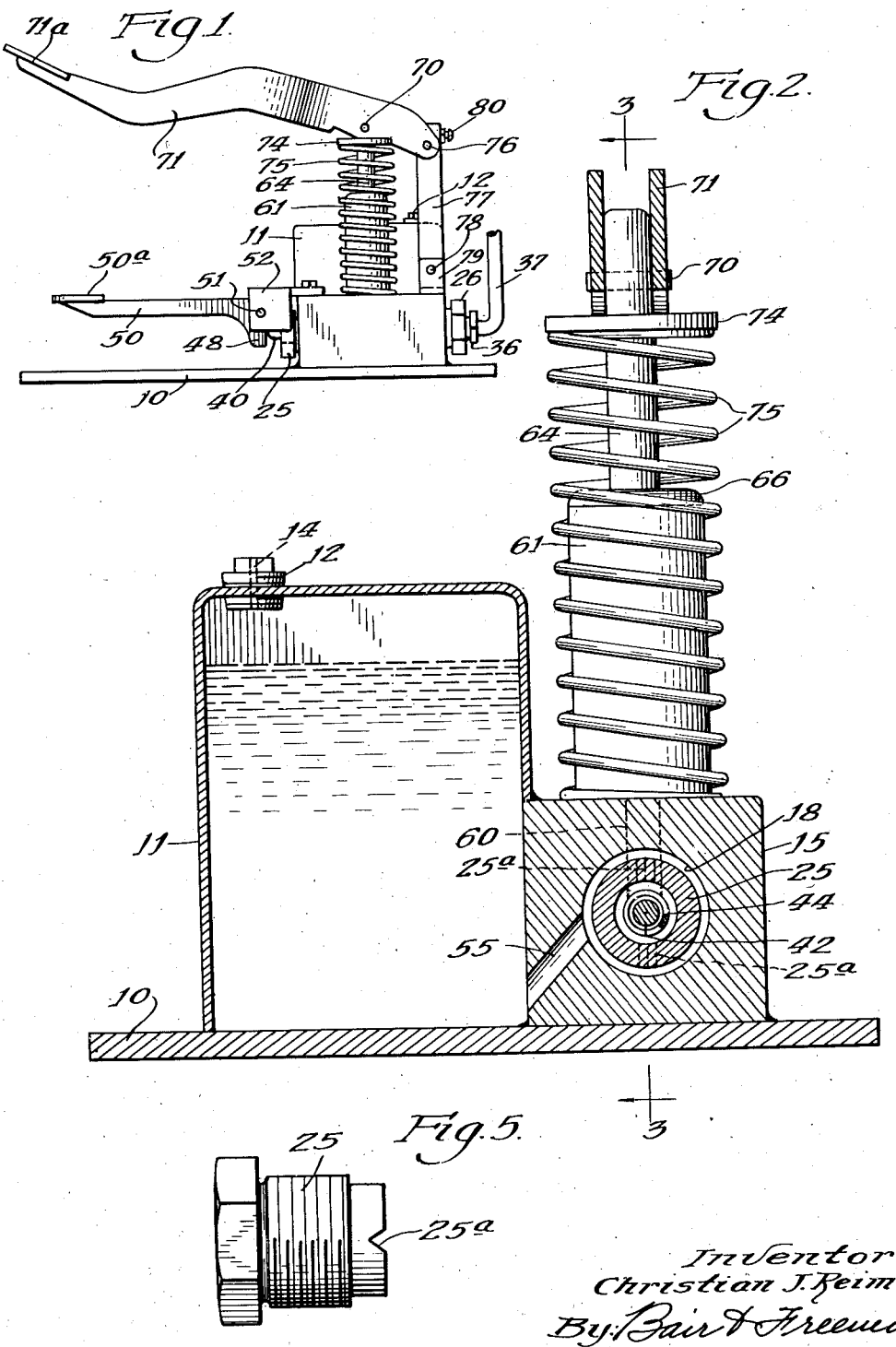
Inventor:
Christian J. Reimuller
By: Bair & Freeman
Attorneys

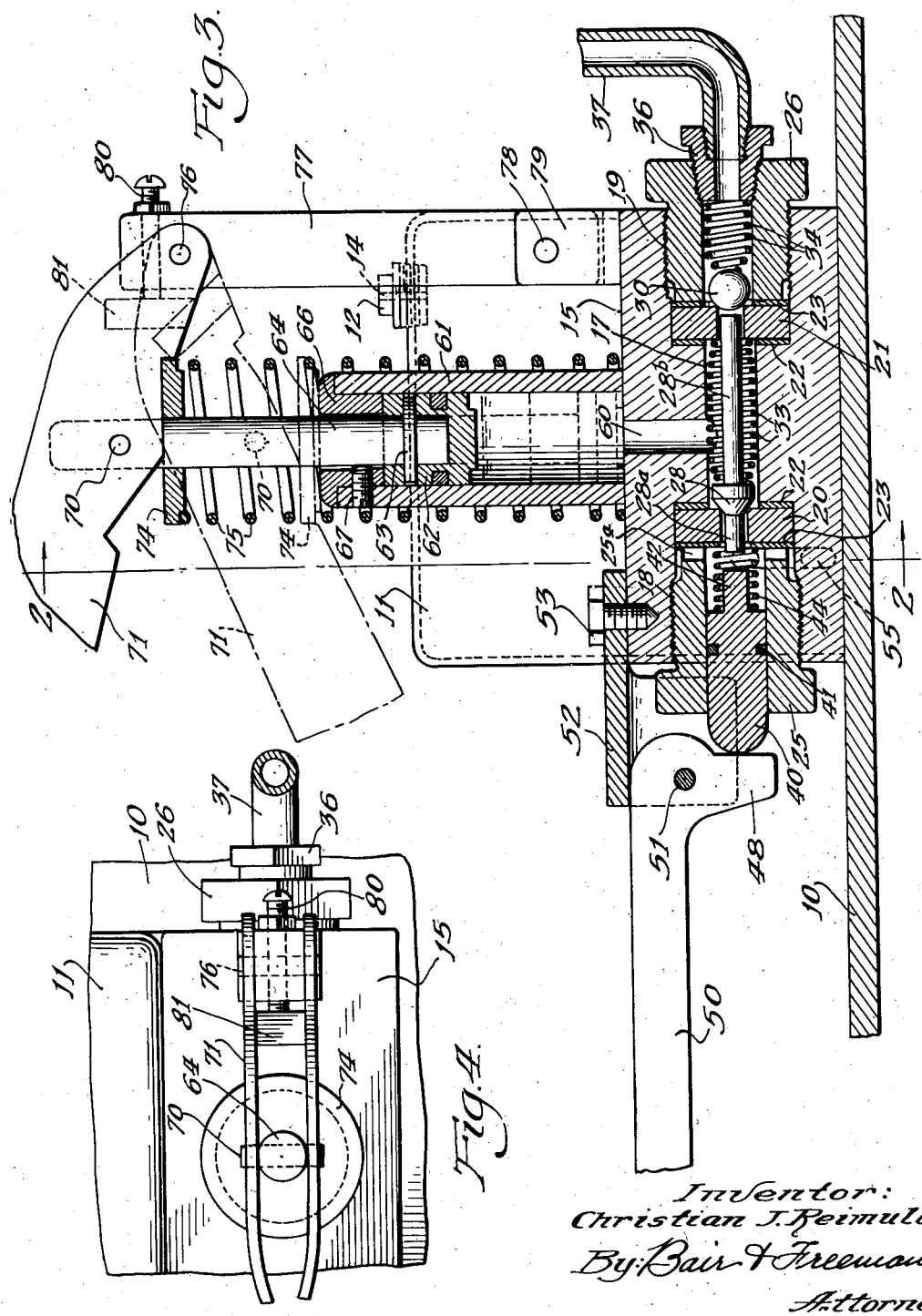

Patented Apr. 16, 1946

2,398,558

UNITED STATES PATENT OFFICE 2,398,558

HYDRAULIC POWER UNIT

Christian J. Reimuller, Chicago, Ill., assignor to Harold T. Munton, Evanston, Ill.

Application November 22, 1943, Serial No. 511,313

2 Claims. (Cl. 60—52)

The present invention relates to hydraulic power units of the portable type, and more particularly to power units adapted to be directly actuated by an operator. Power units of this type are adapted to supply the source of energy for operating various types of hydraulic tools and machines, such as, for example, a vise, an arbor press, and other apparatus wherein a piston or hydraulic ram is to be actuated.

One of the primary objects of this invention is to provide a novel hydraulic power unit of the character indicated which permits rapid, accurate, high speed operation and adjustment of the piston or ram being controlled.

Another object is to provide an improved, hydraulic power unit of the character indicated, wherein the hydraulic pressure connected for actuating a tool or machine, may be instantaneously relieved under full control of the operator so that the tool or machine being controlled need be moved only an amount necessary for readjustment or replacement of work in the tool or machine, and by virtue of which it is possible to retain in the system, during such readjustment or replacement operation, the major portion of the built up hydraulic pressure within the system.

A further object is to provide a novel hydraulic power unit of the character indicated, which is constructed and arranged so that in subsequent or repeated operations of a tool or machine controlled by the power unit, it will only require the building up of a relatively small portion of hydraulic pressure necessary for obtaining the desired hydraulic pressure for operating the tool or machine.

Still another object is to provide an improved hydraulic power unit of the character indicated, characterized by the provision of a novel valving means, by virtue of which hydraulic pressure may be easily and quickly built up in a pressure system communicating with a ram or piston, and wherein novel release means is provided for maintaining extremely accurate control of the valving means in relieving or reducing the hydraulic pressure in the system, so as to permit reducing to a minimum the amount of hydraulic pressure necessary to be rebuilt each time that the tool or machine is operated or adjusted.

A still further object is to provide a novel hydraulic power unit of the character indicated, which is so constructed as to exclude air from the system during operation of the unit, and which does not require the bleeding of the system after the unit has been connected and in operation.

A still further object is to provide a novel hydraulic power unit of the character indicated, which is provided with a novel valving means, by virtue of which simple and effective removal of air from the system may be accomplished at the time the system is initially connected for operation without the necessity of dismantling, disconnecting or removal of any parts of the power unit.

And still another object is to provide a novel hydraulic power unit of an extremely simplified construction, capable of simple and convenient operation, and one that is rugged and durable as well as economical to manufacture.

Other objects and advantages of this invention will be apparent from the following description, taken in connection with the accompanying drawings, in which—

Fig. 1 is a side elevational view of the hydraulic power unit embodying the present invention.

Fig. 2 is an enlarged, transverse, vertical sectional view through the hydraulic power unit, taken substantially as indicated at line 2—2 on Fig. 3.

Fig. 3 is an enlarged, vertical, sectional view through the power unit, taken substantially as indicated at line 3—3 on Fig. 2.

Fig. 4 is a fragmentary plan view of the forward portion of the power unit.

Fig. 5 is a side elevational view of an annular bushing employed in the power unit.

The hydraulic power unit embodying the present invention is preferably fabricated as a unitary structure, and is of a size and weight so as to render it readily portable or movable from place to place. The power unit includes a sheet metal, base 10, upon which is mounted an upstanding liquid reservoir 11, the top wall of which reservoir is provided with a threaded opening for receiving a threaded cap plug 12. For convenience, in venting the reservoir to atmosphere, the cap plug 12 is formed with a longitudinal duct 14 therein, as clearly seen in Fig. 2 of the drawings. For simplicity in construction and economy in manufacture, the reservoir is formed of sheet metal open at its bottom and at the lower portion of the right hand side thereof, as clearly seen in Fig. 2 of the drawings. The bottom marginal edge of the reservoir is preferably welded to the sheet metal base 10, and the marginal edges of the opening of the side wall of the reservoir are registered with an elongated metal block 15, to which the marginal edges of the opening of the reservoir are likewise welded, it being understood that the block is likewise welded to the base so as to complete the closure for the reservoir 11.

The block 15, as herein shown, is provided with a longitudinally extending central bore 17, the opposite ends of which are counterbored and threaded, as indicated at 18 and 19, respectively. The portion of the bore 17 intermediate the counterbores may, for convenience, be hereinafter referred to as a duct. Snugly fitted in the inner ends of the respective counterbores are valve seat elements 20 and 21, of annular disc form. Sealing gaskets 22 are interposed between the faces constituting the end walls of the counterbores and the respective valve seat elements, and similar gaskets 23 are disposed against the opposite faces of the valve seat elements and adapted to be abutted by the ends of annular bushings 25 and 26 threaded respectively into the counterbores 18 and 19.

Disposed in spaced apart axial alignment within the central bore of the block are a pair of check valves, normally spring presed against the respective valve seat elements 20 and 21 in the same direction, and as will hereinafter appear in the direction opposite to the flow of liquid in the system in the process of building up pressure therein. These check valves, as herein shown, are of different form; one being in the form of a cone, as indicated at 28, cooperating with the inner face of the valve seat element 20, and the other check valve being in the form of a ball, as indicated at 30, cooperating with the outer face of the other valve seat element 21. A coil spring 33 is disposed in the duct 17 and reacts against the valve seat element 21 at one end, and the opposite end engages the cone valve element 28 for urging it into cooperating engagement with the seat element 20. A coil spring 34 is disposed within the annular bushing 26 and reacts against the ball 30, to maintain it in sealing relation with respect to the valve seat element 21. The spring 34 is seated at its opposite end against pipe bushing 36, threaded into the outer end of the annular bushing 26. It is to be understood that spring 34 exerts a slightly greater pressure on the ball check valve 30 than the spring 33 exerts on the cone check valve 28. As may be seen in the drawings, the pipe bushing is threaded onto the end of a tube or pipe 37, which, it may be understood, is connected at its other end to the end of a cylinder of either a piston or ram of a hydraulically operated tool, machine or other device. The chamber within the annular bushing 26, which is in communication with the pipe 37, together constitute a pressure line conduit and said chamber alone or together with the pipe may hereinafter be referred to as a pressure line conduit of the system.

The cone check valve 28 has a forwardly projecting portion 28ª, extending with substantial clearance through the port opening of the valve seat element 20, as seen in Fig. 3 of the drawings. The opposite end of the cone valve element has integrally connected thereto an operating rod 28ᵇ extending substantially centrally in the duct 17, with its outer end projecting with substantial clearance into the port opening of the valve seat element 21, and terminating in close proximity to the ball check valve element 30.

Reciprocally movable in the annular bushing 25 is an operating member 40, of cylindrical cross section, provided intermediate its length with an annular sealing gasket 41 so as to preclude the escape of liquid from the system. The forward end of the operating member is of reduced cross-section to constitute an actuator and control valve element 42, disposed in alignment with and in relatively close relation to the end of the projection 28ª of the cone valve element 28. Surrounding said reduced portion 28 of the operating member is a coil spring 44, reacting at opposite ends against the adjacent gasket 23, and the shouldered part of the main body of the member 40, for urging the latter in an outwardly direction. The outer end of the operating member 40 normally projects beyond the end of bushing 25 and yieldingly abuts against a depending dog 48, constituting a part of the forward end of a release lever or pedal member 50, which is pivotally mounted at 51 in a clevis bracket 52, detachably connected to the top of the adjacent end to the block 15, by means of a pair of machine screws 53. The purpose and operation of the release lever 50 will hereinafter be described.

Communication between the interior of the reservoir 11 and the duct 17, subject to the control of check valve 28, is provided by an upwardly extending duct or passageway 55 in the block 15, the lower end of which duct opens adjacent the bottom of the reservoir, as clearly seen in Fig. 2, and the upper end opens into the counterbore 18, in registration with an annular cavity formed by the reduction of the forward portion of the bushing 25. Said forward portion of the bushing 25 is provided with suitable openings or ducts to provide communication between the interior of the bushing 25 and said passageway 55. As a simple expedient, the forward end of the annular bushing 25 is formed with a plurality of V-shaped notches or slots 25ª.

Opening into the main bore of the block 15, substantially at the middle of the length of said block, is an upwardly extending passageway 60, which communicates at its lower end with the duct 17, intermediate the check valves 28 and 30. Welded on the top of the block, in central alignment with the passageway 60, is an upright pump cylinder 61, in which there is reciprocably movable, a piston 62 having a floating connection, by means of a pin 63, on the lower end of a piston rod 64. The piston rod is slidably guided in a cap 66, rigidly secured in place on the upper end of the cylinder by a set screw 67. It is to be understood that the opening in the cap for accommodating the piston rod is of sufficient size as to also constitute an air vent for the upper end of the cylinder while the piston is reciprocating in said cylinder. Pivotally connected to the upper end of the piston rod, by means of a pivot pin 70, is an operating lever 71, the under edge of which lever, immediately below the pivot pin 70, abuts against a spring retainer member 74, which seats upon the upper end of a coil spring 75 which, in turn, surrounds the cylinder 61, as clearly seen in Fig. 3 of the drawings. Said spring 75 causes the return of the operating lever 71 to its upper position of adjustment, as seen in Fig. 1.

The forward portion of the lever 71 is pivotally connected by a pivot pin 76 to the upper end of a floating fulcrum bar 77, the lower end of which bar is pivotally connected by a pivot pin 78, to a U-shaped clevis 79, welded on the upper face of the rear end of the block 15. The purpose of the floating pivot bar 77 is to permit accommodation of the lever 71 when the latter is moved up and down in the processes of reciprocating the piston within the cylinder 61. For various conditions it may be desirable to vary the stroke or the initial position of the operating lever 71, and for this purpose I provide an adjustment screw 80 threaded into the upper end of the floating fulcrum bar 77, with the end of the screw positioned to abut against a block 81 on the forward portion of the lever 71. For example, as may be seen in Fig. 3 of the drawings, when the screw 80 is adjusted inwardly, and the lever 71 having first been depressed, the screw will serve as a stop for limiting the upward limiting position of said lever 71.

The extreme outer end of the operating lever 71 is provided with a foot treadle 71ª, and the extreme outer end of the release lever 50 is provided with a foot treadle 50ª. As may be determined from Figs. 2 and 3, the two levers at their pivot ends are in substantially vertical alignment, and it is to be understood that their outer portions diverge slightly so as to afford clearance in operation of the respective levers. The relationship of the two levers to each other, however, is such that when the operating lever 71 is depressed its foot treadle portion 71ª is disposed in such relation to the foot treadle portion 50ª of the release lever that it will be convenient for the foot of the operator, if desired, to maintain the operating lever depressed while, at the same time, and with the same foot, actuate the release lever 50. This arrangement makes it extremely simple for the operator to properly balance himself and have complete control of the power unit while, at the same time, having both hands free for the handling or adjustment of work or material in connection with the tool or machine being controlled by the power unit.

*Operation*

After the power unit is initially connected up in the system with the piston or ram that is to be controlled thereby, and the reservoir 11 is filled with a substantial quantity of liquid, such as oil, the release pedal 50 is first depressed a slight amount so as to move the cone check valve element 28 out of engagement with its seat element 20, and during which adjustment of the check valve the lever 71 is then actuated for a few strokes. Upon the upstroke of the lever 71, the piston is moved upwardly within the cylinder 61 so as to create a suction action, drawing the liquid from the reservoir 11 through the passageway 55, into the chamber around the forward end of the bushing 25, through the slots 25ª, at the forward end of the bushing, and thence through the port of the valve seat element 20, into the duct 17, and through the upwardly extending passageway 60, to the interior of the cylinder 61. As the piston moves downwardly, during the down stroke of lever 71, the air and liquid within the cylinder and the ducts and passageways become intermixed and agitated as a result of the turbulent action thereon, and such admixture is expelled through the ducts and passageways back into the reservoir 11 where the air is permitted to escape through the atmospheric duct or vent 14. Such action may result in forcing a small quantity of the admixture of liquid and air past the ball check valve element 30, but because the cone check valve element 28 remains open, the major portion of the liquid and air in such admixed form is caused to be expelled directly back into the reservoir. After this operation is repeated a number of times, the passageways, ducts and cylinder finally become filled with liquid, the air having been substantially removed from the system. In the event, however, that a small amount of air still remains and is expelled up through the pressure line conduit, it may be conveniently bled off at the upper end at the connection of the conduit to the cylinder of the piston or ram to which it is connected, prior to operating the system.

After the air has thus been removed from the power unit, the release lever 50 is disengaged and assumes the position in Fig. 3 of the drawings, and the check valve 28 is again seated. The lever 71 is then actuated a number of times to build up the liquid in the pressure line conduit beyond the check valve 30 to the desired pressure. It will be apparent that the upstroke of the piston will create a suction action so as to draw the cone check valve 28 away from its seat element 20, and thereby draw the liquid from the reservoir 11, through the passageway 55, slots 25ª, the port of the valve seat element 20, into the duct 17, thence upwardly through the passageway 60 to fill the cylinder 61 below the piston. Upon the downstroke of the piston, the cone check valve 28, under influence of spring 33, is immediately seated, and as a pressure on the liquid is built up by the downward movement of the piston, the ball check valve 30 is moved off its seat element 21, and the liquid is forced from the duct 17 through the conduit of the bushing 26, into the pipe 37. This operation may be repeated, as above stated, until the desired hydraulic pressure is built up in the system for acting upon the piston or ram of the tool or machine which is to be controlled or actuated by the power unit. It will be manifest that the smaller the cross sectional dimensions of piston and cylinder, the greater will be the hydraulic pressures developed. It has been found that with a unit of approximately the dimensions represented in Fig. 3 of the drawings, that it is possible to build up hydraulic pressures of several thousand pounds per square inch, which has been found satisfactory for use in connection with various types of tools and other devices.

When it is desired to relieve the pressure in the system, the release lever 50 and associated elements are so designed as to function by a natural operation of the operator, which consists in the operator applying, quickly, a substantial pressure or weight upon the treadle 50ª of the release lever 50. In so doing, the operating member 40 is quickly projected inwardly so that the control valve element 42 thereof, impinges against the adjacent end of the projecting portion 28ª of the cone check valve element 28, shifting the latter to the right from the position seen in Fig. 3 of the drawings, opening check valve 28, and in so doing, the outer end of the operating rod 28ᵇ of the check valve 28 engages the ball check valve element 30 and moves it off its seat. It will be apparent that such movements, all as a result of depressing of the release lever 50, are against the reaction of the springs 44, 33 and 34. When the release lever is so operated, the end of the control valve 42, of the member 40, abuts against the valve seat element 20 and seals the port opening thereof, so that the liquid under pressure in the system cannot be returned to the reservoir 11. However, the pressure in the system, by such action of the release lever, may be relieved a slight amount by the equalization of pressures between the liquid in conduit 37 and what liquid remains in the ducts 17, passageway 60 and the lower portion of the cylinder 61. The operator may then gradually permit the release lever 50 to move upwardly a slight amount, as may be determined by observation of the tool or machine being controlled, so as to control the movement of the valve element 42 away from the valve seat element 20 so as to permit the liquid under pressure in the system to be returned to the reservoir 11 under full control of the operator. When the tool or machine has acquired a desired position of adjustment, the operator may totally relieve the release lever 50 of all pressure, thus permitting the check valves 28 and 30 to assume closed position, as seen in Fig. 3 of the drawings, and thus retain within the conduit 37 the major portion of the hydraulic pressure built up therein, so that on the next operation of the power unit, or controlling, adjusting or operating the tool or device connected thereto, it will only be necessary to build up the pressure representing the difference between that desired and that to which the pressure has been reduced by the operation of the release lever 50.

If it is desired to quickly and instantly reduce the hydraulic pressure in the system to atmospheric pressure, it will only be necessary to depress the release lever 50 an amount so that the check valve 28 and ball check valve 30 are moved to open position, which may be conveniently and easily accomplished by the operator observing the movement of the tool or machine, or parts being operated upon.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim as my invention:

1. An operator actuated hydraulic power unit, comprising a liquid reservoir, a pressure line conduit, a duct connecting the interior of the reservoir to said conduit, two normally closed check valves arranged in spaced apart relation in said duct, said valves both being seated in opposition to the direction of flow of liquid from the reservoir, separate springs for yieldingly holding the check valves seated, a pump cylinder communicating with said duct intermediate the check valves, a piston in said cylinder, a lever operably connected to said piston for reciprocating it in the cylinder, whereby movement of the piston in one direction causes one of said check valves to open, against the reaction of its spring, to permit passage of liquid from the reservoir into said duct and pump cylinder, and upon movement of the piston in the opposite direction the force on the liquid in said cylinder and duct causes opening of the other check valve, against the reaction of its spring, to permit passage of the liquid into the pressure line conduit, whereby repeated actuations of said lever causes a building up of liquid pressure in said pressure line conduit, and release means comprising a member adapted to be initially actuated for moving said one check valve to open position to relieve pressure in said duct and cylinder, said one check valve including an operating rod terminating in close proximity to said other check valve, whereby further movement of said member causes said other check valve to move to open position to relieve the pressure on the liquid in said pressure line conduit and permitting the return of liquid from said conduit, said member of the release means comprising a control valve adapted to engage and actuate said one check valve incident to initial amount of movement of said member, and adapted to close the port of said one check valve, incident to still further movement of said member, for controlling the relieving of pressure on the liquid in said conduit, and the rate of return of the liquid in said conduit.

2. An operator actuated hydraulic power unit, comprising a liquid reservoir, a pressure line conduit, a duct connecting the interior of the reservoir to said conduit, two normally closed check valves arranged in spaced apart relation in said duct, said valves both being seated in opposition to the direction of flow of liquid from the reservoir, separate springs for yieldingly holding the check valves seated, a pump cylinder communicating with said duct intermediate the check valves, a piston in said cylinder, a lever operably connected to said piston for reciprocating it in the cylinder, whereby movement of the piston in one direction causes one of said check valves to open, against the reaction of its spring, to permit passage of liquid from the reservoir into said duct and pump cylinder, and upon movement of the piston in the opposite direction the force on the liquid in said cylinder and duct causes opening of the other check valve, against the reaction of its spring, to permit passage of the liquid into the pressure line conduit, whereby repeated actuations of said lever causes a building up of liquid pressure in said pressure line conduit, release means comprising a member adapted to be initially actuated for moving said one check valve to open position to relieve pressure in said duct and cylinder, said one check valve including an operating rod terminating in close proximity to said other check valve, whereby further movement of said member causes said other check valve to move to open position to relieve the pressure on the liquid in said pressure line conduit and permitting the return of liquid from said conduit, said member of the release means comprising a control valve adapted to engage and actuate said one check valve incident to initial amount of movement of said member, and adapted to close the port of said one check valve, incident to still further movement of said member, for controlling the relieving of pressure on the liquid in said conduit and the rate of return of the liquid in said conduit, a spring for opposing such actuating movement of said member, and a lever for operating said release means, said release lever and piston lever being dimensioned and having their pressure applying areas thereof juxtaposed in vertical and horizontal relationship so as to be simultaneously engaged by a single member of the operator for obtaining simplified control of the power unit.

CHRISTIAN J. REIMULLER.